United States Patent [19]

Hosler

[11] Patent Number: 5,163,121
[45] Date of Patent: Nov. 10, 1992

[54] MODULE PLOTTING METHOD

[75] Inventor: Gene L. Hosler, Germantown, Ohio

[73] Assignee: Blaeser Engineering Services, Inc., Dayton, Ohio

[21] Appl. No.: 633,709

[22] Filed: Dec. 21, 1990

Related U.S. Application Data

[63] Continuation-in-part of Ser. No. 500,635, Mar. 28, 1990.

[51] Int. Cl.$^5$ ............................................. G06K 15/00
[52] U.S. Cl. ..................................... 395/103; 375/106
[58] Field of Search ...................... 395/101, 103, 106; 346/154, 1.1, 74.2, 139 R, 134, 135.1, 111, 112, 113, 105, 106; 340/729, 730

[56] References Cited

U.S. PATENT DOCUMENTS 4,313,073   1/1982   Yamamoto ........................... 395/103

Primary Examiner—Arthur G. Evans
Attorney, Agent, or Firm—Biebel & French

[57] ABSTRACT

A method of plotting a rectangular section of a regional image on a rectangular base plate. The base plate is positioned snugly in a frame having a recess of such a depth that the surface of the frame and the surface of the base plate define a substantially continuous surface. A CAD program is used to control a plotter to plot image information on the base plate and on the surrounding frame. The rectangular section of interest corresponds precisely with the image portion which is plotted on the base plate.

10 Claims, 4 Drawing Sheets

MODULE PLOTTING METHOD

CROSS REFERENCE TO RELATED APPLICATION

This application is a continuation-in-part of Ser. No. 07/500,635, filed Mar. 28, 1990.

BACKGROUND OF THE INVENTION

This invention relates to display boards such as boards of the type used by electrical power companies to display representations of power lines and switches on a map of a region. Prior art display boards of this particular type have been relatively expensive, difficult to update, or of poor graphic quality.

One prior art system utilizes plastic squares or tiles that are mechanically snapped into special frames to form a graphic mosaic. These tiles are typically 1" square. Standard graphics and symbols are applied to each square by etching, silk screening or other convenient technique, and the tiles are selected and assembled to form the desired image. Thousands of such tiles are required in a typical display board. Thus the board is generally used to depict transmission or distribution systems in a schematic format rather than a geographic format, which requires a resolution not easily achieved by such tiles. Typical examples of such boards are disclosed in Navalle U.S. Pat. No. 2,804,607 and in Canadian Patent No. 770,860. A prior art mosaic tile display board portraying a geographical background is disclosed in Neuberger U.S. Pat. No. 4,505,061.

Another prior art display board used for representing electrical power distribution systems comprises a steel peg board painted to represent a geographical background. Power distribution equipment is represented by applying pieces and strips of tape to the painted board.

An improved display board is disclosed in copending, commonly owned U.S. patent application Ser. No. 07/316,120 filed Feb. 24, 1989 and incorporated herein by reference. That display board uses a matrix of rectangular modules, each comprising a flexible steel base plate imprinted on one side by a pattern of graphics. Magnetic rubber sheet material is used for releasably mounting the modules on a support board. When the modules are assembled upon the support board in their proper arrangement, their printed patterns cooperatively display a regional image. Printing is accomplished by silk screening or by computer driven plotting. The present application relates to a method of accomplishing such plotting.

SUMMARY OF THE INVENTION

This invention provides a method of plotting a selected, rectangular section of a regional image on a rectangular base plate for a display module. In accordance with the method of this invention, image density information for a series of image points defining the regional image are stored in a memory together with rectangular coordinate information for each of the image points. Preferably this data is manipulated through the use of commercially available CAD software. A plotting reference point is established at a predetermined location relative to a corner of the section to be plotted. Preferably, the reference point is situated at a location offset from the selected section, so that it may serve as a corner point for a plotting window which includes and surrounds the section.

The base plate to be plotted is mounted in a plotting frame provided with a rectangular recess, having an outline congruent with the outline of the base plate and a depth equal to the thickness of the plate, so that the top of the plate and the top of the frame cooperatively define a substantially continuous surface. A marking pen is positioned in marking relation to this surface.

When the marking pen is in marking position, image density information for the image points which are within the plotting window are read out from the memory and applied to the marking pen to cause a series of visible marks to be plotted on the base plate and the frame. At the same time the rectangular coordinate information for those same image points is read out from the memory and used to cause coordinated movement of the marking pen across the base plate and the surrounding frame. The coordinates of the reference point are used to establish a marking reference position for the marking pen. Preferably, that reference position is at a corner of the plotting window and corresponds to a point on the frame which is offset from a corner of the base plate. The movement control of the marking pen is scaled such that image points within the section are marked across the full extent of the base plate, and image points outside the section are marked on the frame, with the result that no unmarked border area appears on the base plate.

Preferably, image density information and image point coordinates are stored in the memory for all sections comprising the image region. A plotting sequence commences by creating a video display of a portion of the regional image surrounding the sections to be plotted. A plotting window is superimposed on the display with the appropriate corner thereof positioned at the reference point for the section. The plotting window is adjusted to surround the selected image section by assigning predetermined length and width dimensions to the window. Next, a scale factor is selected which relates the dimensions of the base plate to the size of the image section to be plotted. Image data is then read out from memory for all points within the plotting window, and the marking pen plots these points in an area including and surrounding the base plate. Image point coordinate information controls the movement of the marking pen.

Preferably, the base plate comprises flexible die-cut steel, and the plotting frame comprises sheet steel framing mounted upon a magnetic surface. The magnetic surface holds the plotting frame and the base plate securely in position, so that the marking pen can perform a precision plotting operation.

It is therefore an object of this invention to provide an improved method for marking image information on rectangular modules for display boards.

Other and further objects and advantages of the invention will be apparent from the drawing, the following description and the appended claims.

DESCRIPTION OF THE PREFERRED EMBODIMENT

Figure 1:
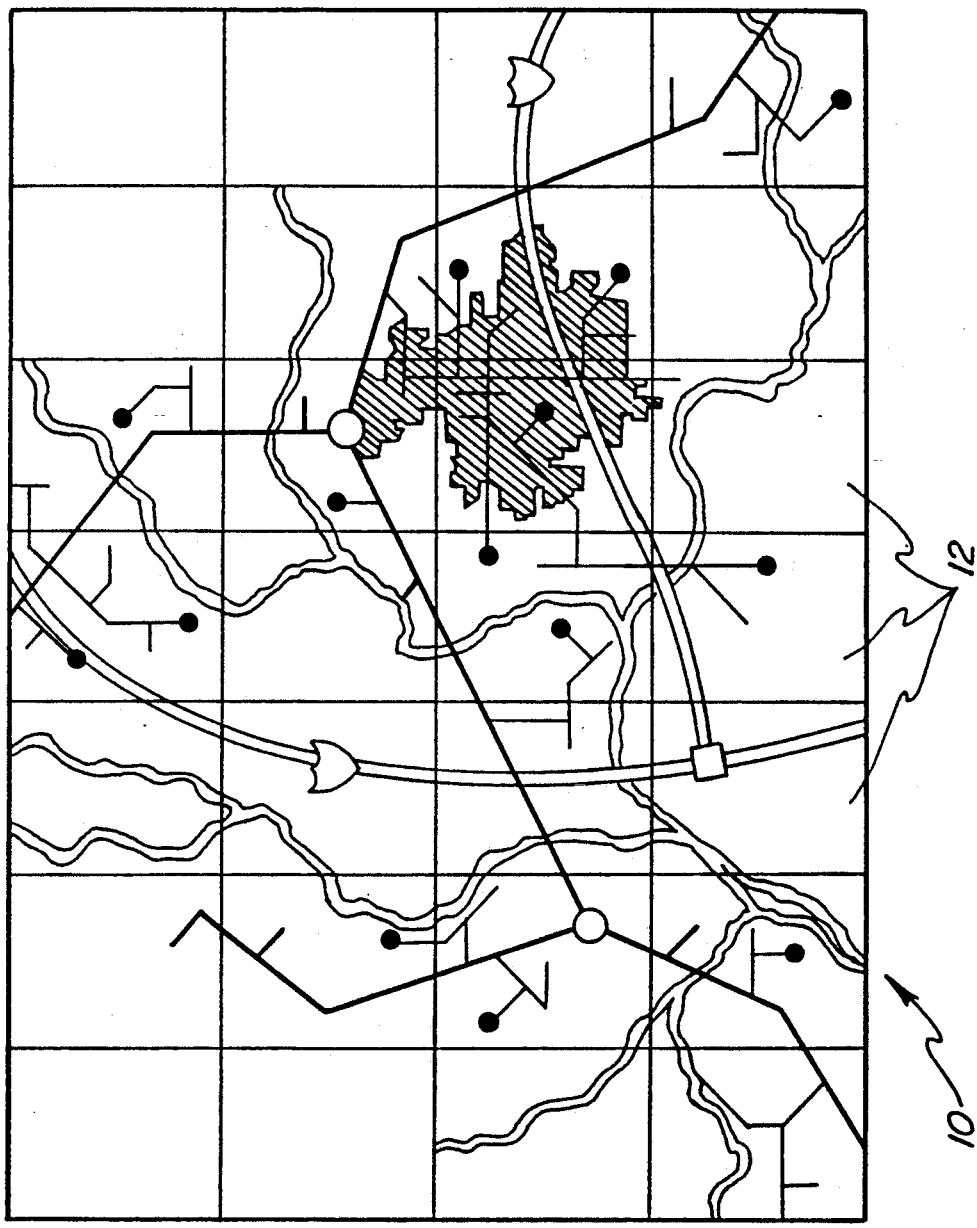
FIG. 1 is a schematic illustration of a display board comprising a series of contiguous modules.

A display board 10, as generally illustrated in FIG. 1 may include a series of rectangular display modules 12, each of which contains graphical markings for a corresponding rectangular section of a large image region. Display modules 12 may be fabricated from die-cut sheet steel, as described in Ser. No. 07/316,120 and may be galvanized and sprayed with an appropriate base coating prior to marking. Display modules 12 are held in place by magnetic rubber sheet material secured to a support frame (not illustrated).

Figure 2:
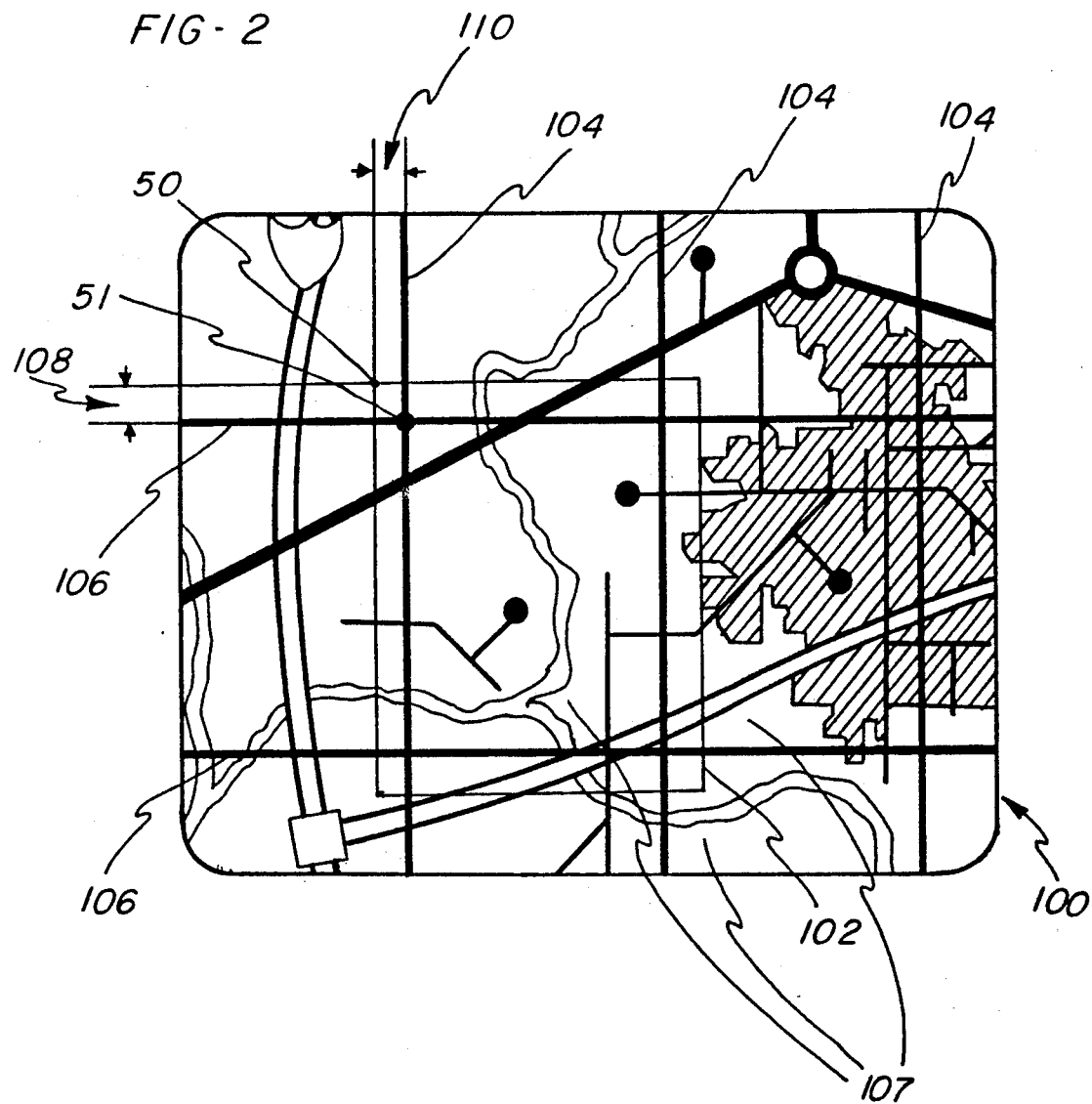
FIG. 2 is a schematic illustration of a video display for an image area including an image to be plotted.

Image information for an image region to be illustrated on display board 10 is digitized and stored in a format suitable for accessing by a computer-aided drafting program. A number of appropriate programs (commonly referred to as CAD programs) are commercially available. One such program which has been used satisfactorily is available from Autodesk, Inc. under the name AutoCAD. This software may be run on an IBM PC and compatibles operating under control of a disk operating system available from Microsoft Corp. under the trademark MS-DOS. AutoCAD and other available CAD software are capable of accepting digital information for an image region such as the image region which has been reproduced on display board 10. Such image information may be associated with a "layer" and displayed on a monitor. A rectangular grid may be created and associated with a different layer which may be displayed on the monitor superimposed upon the display of the image region. When so displayed, the video display on the monitor may appear identical to the rendition of display board 10 as illustrated in FIG. 1, alternatively the display may be "zoomed" to appear as illustrated in FIG. 2. It will be appreciated that the grid lines on the display may be turned on or off at will by merely switching the associated layer on or off.

CAD programs generally have the capability of displaying a plotting window on the monitor as a rectangular outline superimposed upon the other graphics. Such a plotting window is indicated by the reference numeral 102 of FIG. 2. In accordance with this invention, a plotting window may be selected which is generally rectangular and slightly larger in size than one of the image sections to be plotted on a module 12. The CAD program then will cause a suitable plotter to plot all image information appearing within the plotting window. A scale factor may be selected such that the plotted information will be recorded at any desired physical size within the capability of the plotter. In accordance with this invention and as hereinafter described in more detail, a plotting scale factor is selected such that a rectangular image section encompassed within the above-mentioned grid lines will be physically plotted with length and width dimensions precisely the same as those of modules 12. Also, as hereinafter discussed, the plotting window is positioned on the monitor with a reference corner offset from a corresponding corner of an associated image section. The object of such sizing, scaling and positioning is to enable plotting of the entire image region on a series of contiguous rectangular modules with no border region on any module.

Figure 3:
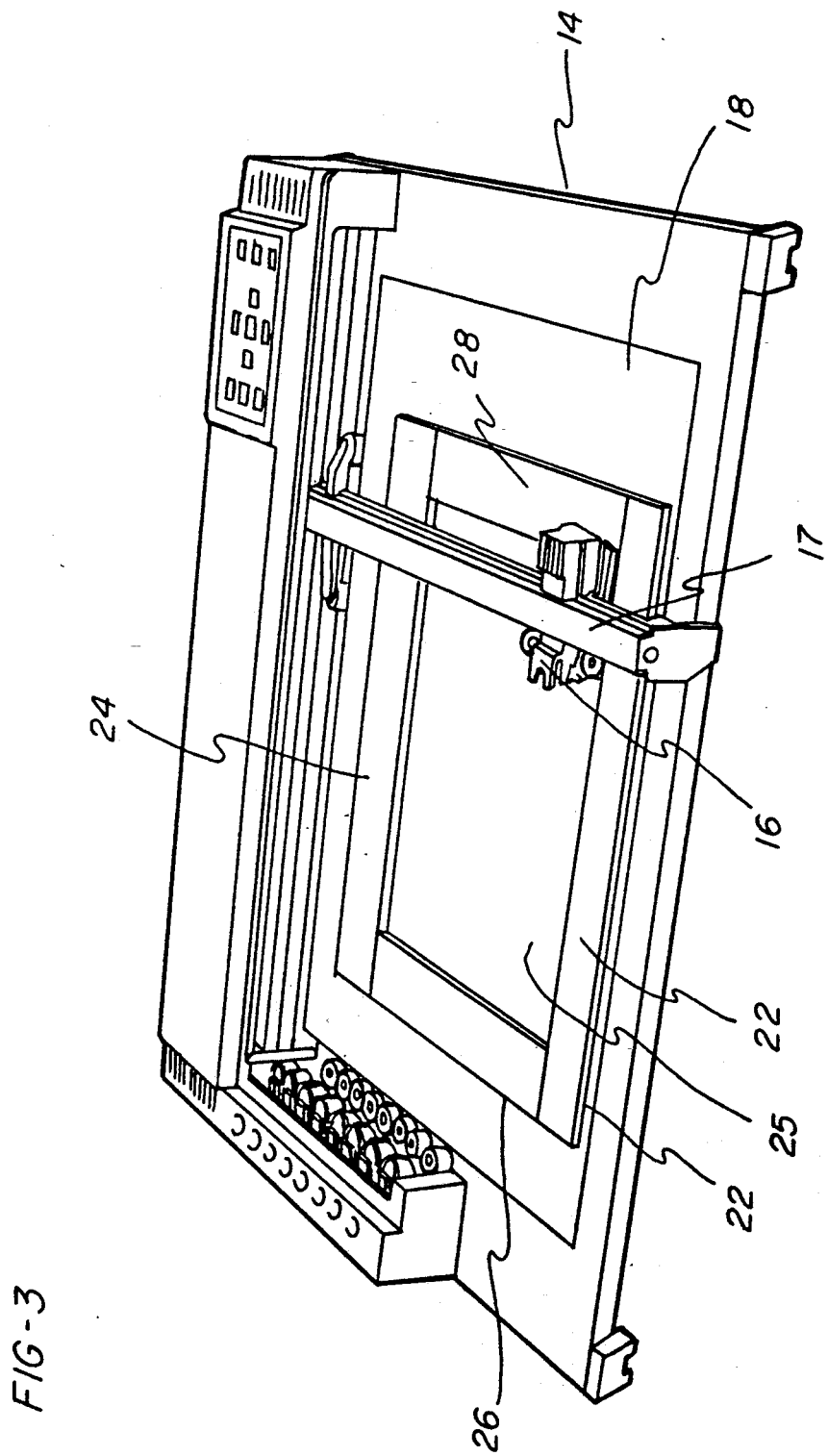
FIG. 3 is a perspective drawing of an X-Y plotter with a plotting frame in place.

Marking of a module 12 is accomplished with an X-Y plotter such as plotter 14 of FIG. 3. A suitable plotter for such purposes is a DXY-885 plotter available from Roland DG Corporation. Such a plotter has a magnetic surface plate 18 which is particularly useful in the practice of this invention.

A frame comprising four steel framing strips 22,24,26,28 is attached to magnetic surface 18 to define a recess 25. The length and width dimensions of recess 25 are just barely larger than the length and width dimensions of a steel base plate for a display module 12. The size of the recess may be adjusted by magnetically attaching a base plate 13 (see FIG. 5) for a display module 12 to magnetic surface 18 and then fitting framing strips 22,24,26,28 snugly around the base plate. The base plate 13 (or a plotted module 12) may then be removed by applying a suction cup near one edge. Base plates 13 are fabricated from flexible die-cut galvanized steel sheet material having a thickness which is preferably about 24 gauge. Framing strips 22,24,26,28 are fabricated from die-cut sheet steel of the same thickness, so that when a base plate 13 is placed in recess 25, a substantially continuous plane surface will result. Plotter 14 has a marking head 16 including a marking pen 30 and a marking tip 32 which are positioned in marking relation to that surface. Marking head 16 is carried therealong by a carriage 17 which has a capability for two-dimensional movement.

It will be appreciated that marking head 16 should be provided with a marking fluid which is suitable for the particular base plate being marked and for the plotting pen being used. As noted above, the preferred steel base plate is galvanized and sprayed with a base coating in accordance with the teachings of Ser. No. 07/316,120. A preferred plotting pen is a KOH-I-NOOR Radiograph Model G3VTB ("0" size) with the control wire removed. A preferred marking fluid for such a base plate and plotting pen may be prepared from Sinvaqua inks, available from Sinclair and Valentine, L. P. of North Kansas City, Mo. These inks are available in a variety of colors and should be reduced by using a reducer made up of eight parts water and one part Sinvaqua K-87899 reducer. The reducer is added to the ink as necessary to obtain a fluid viscosity conductive to good flow through the pen. Then the mixture is cross-linked using 2% by volume of Sinvaqua K-87274 cross-linker.

Figure 5:
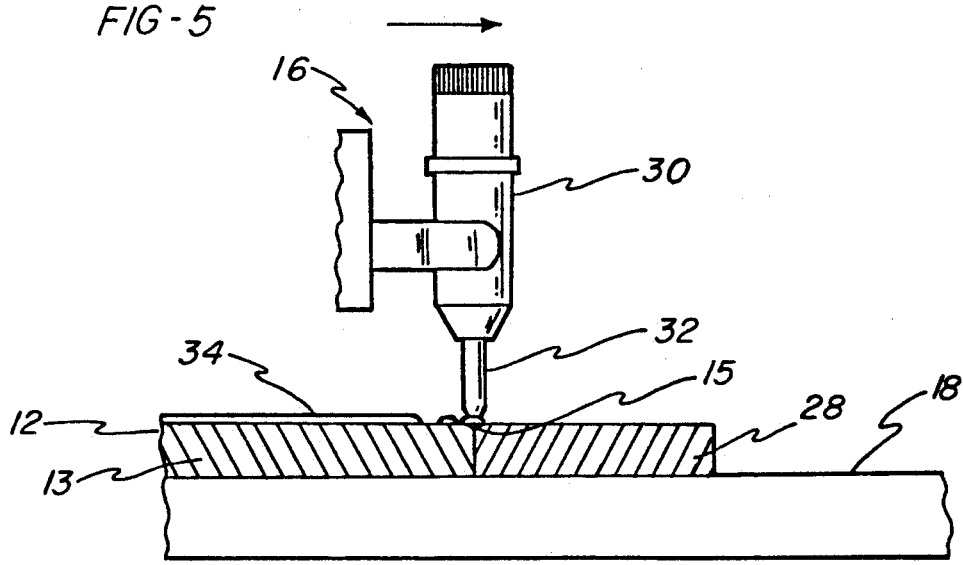
FIG. 5 is a schematic side elevation view of a marking pen traversing a boundary line between a base plate and a plotting frame.

The operation of marking head 16 is illustrated in FIG. 5. Marking tip 32 moves across the surface of base plate 13 of module 12 depositing a film of marking ink 34 as it travels. Base plate 13 fits snugly against framing strip 28 with only a minor surface discontinuity 15. Marking tip 32 easily traverses this discontinuity and marks the surface of framing strip 28 as well as the surface of base plate 13. Therefore, base plate 13 is marked all the way to its edge, thereby leaving no border. Thus when a resulting module 12 is mounted on a display board 10 adjacent another module 12, a continuous graphic rendition results.

It will be appreciated that precise registration must be maintained between marking operations for different ones of modules 12 so as to achieve the desired graphic result. The method for achieving such registration may be understood by referring to the video display of FIG. 2 and the plotted result illustrated in FIG. 4.

FIG. 2 illustrates a video display which may be observed on a monitor 100 when drive by a computer operating under control of a CAD program loaded with graphic information defining a regional image to be cooperatively displayed by all display modules 12 of a display board 10. Monitor 100 displays only a relatively small portion of the regional image. The amount of the regional image so displayed may be adjusted through use of a zoom control which is available through the software. As noted above, the CAD program has a feature which permits simultaneous display of information associated with different display layers. Thus power distribution equipment and background geographical characteristics may be stored in memory in different layers. Likewise there may be a third layer storing graphics for a grid comprising a series of horizontal lines 106 and a series of vertical lines 104. This grid defines a series of image sections 107, each comprising display information corresponding to the graphics to be printed on one of display modules 12.

The CAD program also contains provision for displaying a plotting window 102 on monitor 100. Icon controls are provided for selecting the length and width dimensions of plotting window 102. These dimensions are expressed in terms of true distances between geographical features on the regional image. The program adjusts the size of the window 102 so as to encompass a geographical area having the dimensions specified for the plotting window. The CAD program causes plotter 14 to plot everything (except grid lines 104,106) which is encompassed within plotting window 102. Another icon control is provided for selecting a scale factor. This latter control is used to select a scale factor such that an image area corresponding to an image section 107 will be plotted at the size of a base plate 13. In this regard it will be noted that grid lines 104,106 as spaced so as to provide proportions for sections 107 which are the same as those of modules 12.

In order to achieve exact registration between the graphics plotted on different ones of modules 12, one corner of the plotting window 102 is used as a reference point. Such a reference point is indicated by the reference numeral 50 of FIG. 2. It will be seen that reference point 50 is offset from a corresponding corner 51 of a surrounded image section 107 by a pair of offset distances 108,110. The program knows the location of corner 51, as well as the locations of the corresponding corners for all other sections 107. An offset point 50 is specified for each section 107 by applying the distances 108,110 to the coordinates of the appropriate corner of the section. As illustrated in FIG. 5, the upper left-hand corners of the sections are used for generation of reference points 50.

Figure 4:
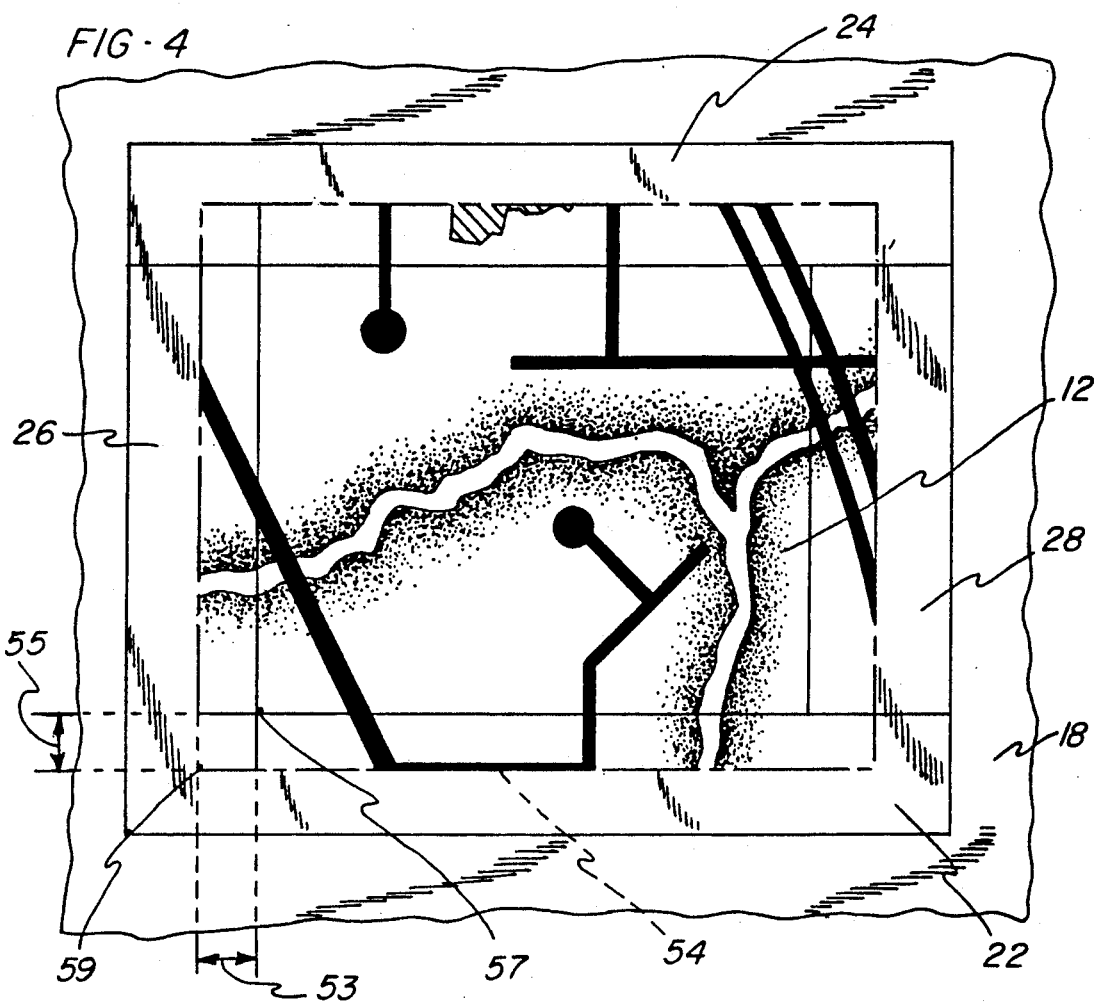
FIG. 4 is a schematic illustration of a display module mounted in place within a plotting frame; marking thereof having been completed.

FIG. 4 illustrates a plot which may be produced under control of a CAD program, which has been manipulated as above described. It will be observed that the plotter marks a pattern corresponding to the graphics contained within plotting window 102 and that the graphics marked on a base plate 13 correspond to the graphics on an image section 107 which is surrounded by the plotting window 102. However, the graphics are rotated 90° counterclockwise to accommodate the plotter 14. The borderline 54 of the plotted graphics corresponds to the plotting window 102. One corner 59 of the borderline 54 corresponds to the corner 50 of plotting window 102. The corner 59 is offset from the corner 57 of module 12 by distances 53 and 55 corresponding to the distances 108, 110 on monitor 100. The point 59 is a plotting reference position for marking pen 30.

Registration may be established by operating the CAD program to position the upper left corner of plotting window 102 at any selected reference position 50 and setting a convenient scale factor such as 1:50,000. If it is desired, for instance to print 0.5 inches on all sides of an 8½"×11" base plate, then a window size of 7.4968 mi×9.4693 mi is selected. Then the plotter may be operated to draw the borders of the section 107 which corresponds to the selected reference point 50. This will print an 8½"×11" rectangle (rotated 90° as stated above) on surface 18. A display module 12 is positioned on this rectangle, and framing pieces 22,24,26,28 are positioned snugly around module 12, as described above. Thereafter, when a base plate 13 is placed in the aperture 25 which has been so framed, it is possible to plot any one of sectors 107 on that base plate by accessing the data base under control of the CAD program, selecting a plotting window size of 7.4968 by 9.4697 mi, selecting a scale factor of 1:50,000 and placing the upper left corner of the plotting window at the coordinates of the appropriate reference point 50. The sequence concludes by initiating a plotting operation with the required 90° rotation. During the plotting operation image density information which has been stored in the memory for image points within plotting window 102 is used to generate marking control signals. These marking control signals are applied to marking pen 13 for regulation of the flow of marking fluid 34. At the same time the rectangular coordinate information for those same image points is used to generate positioning signals for application to carriage 17. Carriage 17 operates under control of the positioning signals to move the marking pen to the correct position for the points being plotted. The selected scale factor controls the effective gain of the positioning signals.

It will be appreciated that plotting window 102 may be adjusted to make the plotted area on the frame arbitrarily narrow; the principal function of the framing strips being to support marking pen 30 when it is at the perimeter of base plate 13. In the limit plotting window 102 may coincide with a section 107, so that reference point 50 becomes coincident with the corner 51 of a section 107 being plotted.

While the method herein described constitutes a preferred embodiments of this invention, it is to be understood that the invention is not limited to this precise method, and that changes may be made thereto without departing from the scope of the invention, which is defined in the appended claims.

What is claimed is:

1. A method of plotting a predetermined, rectangular section of a regional image on a rectangular base plate for a display module comprising the steps of:

storing image density information for a series of image points defining said regional image in a memory together with rectangular coordinate information for each of said image points, mounting said base plate in a plotting frame having a rectangular recess; said recess having an outline congruent with the outline of said plate and a depth equal to the thickness of said plate, so that the top of said plate and the top of said frame cooperatively define a substantially continuous surface, using said image density information to generate a series of marking signals corresponding to the densities of those of said image points which are within a predetermined plotting window including and surrounding said section, using the rectangular coordinate information for the image points within said plotting window to generate positioning signals associated with said marking signals, positioning a marking pen in marking relation to said base plate and said frame, moving said marking pen across the full extent of said base plate under control of said positioning signals while concomitantly applying said marking signals to said marking pen to cause a series of visible marks to be plotted on said base plate and its perimeter, using coordinates for a predetermined reference point to establish a marking reference position for said marking pen, and scaling said positioning signals so that image points within said section are marked across the full extent of said base plate with no unmarked border area.

2. A method of plotting a predetermined, rectangular section of a regional image on a rectangular, flexible steel base plate for a display module comprising the steps of:

storing image density information for a series of image points defining said regional image in a memory together with rectangular coordinate information for each of said image points, positioning steel framing strips on a magnetic surface to define a frame having a framing recess congruent with the outline of said plate; said framing strips having a thickness equal to the thickness of said base plate, magnetically attaching said base plate to said surface within said recess, so that the top of said plate and the top of said frame cooperatively define a substantially continuous surface, using said image density information to generate a series of marking signals corresponding to the densities of those of said image points which are within a predetermined plotting window including and surrounding said section, using the rectangular coordinate information for the image points within said plotting window to generate positioning signals associated with said marking signals, positioning a marking pen in marking relation to said base plate and said frame, moving said marking pen across said base plate and said frame under control of said positioning signals while concomitantly applying said marking signals to said marking pen to cause a series of visible marks to be plotted on said base plate and same frame, using coordinates for a predetermined reference point to establish a marking reference position for said marking pen, and scaling said positioning signals so that image points within said section are marked across the full extent of said base plate with image points outside said section being marked on said frame, so that no unmarked border area appears on said base plate.

3. A method according to claim 2 wherein said reference point is offset from said section.

4. A method according to claim 3 wherein said reference point coincides with a corner of said plotting window.

5. A method according to claim 4 and further comprising the steps of:

displaying a portion of said regional image on a video monitor; said portion including at least all of said plotting window, and positioning said corner of said plotting window at said reference point.

6. A method of plotting a predetermined, rectangular section of a regional image on a rectangular, base plate for a display module comprising the steps of:

storing image density information for a series of image points defining said regional image in a memory together with rectangular coordinate information for each of said image points, positioning framing material on a support surface to define a frame having a framing recess congruent with the outline of said plate; said frame having a thickness equal to the thickness of said base plate, placing a base plate within said recess, so that the top of said plate and the top of said frame cooperatively define a substantially continuous surface, positioning a marking pen in marking relation to said base plate and said frame, supplying said image density information and said rectangular coordinate information to a CAD program, operating said CAD program to define a plotting window including at least all of said section, and using said CAD program to position and operate said marking pen for plotting a reproduction of that portion of said regional image contained within said plotting window; said section being plotted across the full extent of said base plate with said frame supporting said marking pen during plotting of image points at the perimeter of said base plate.

7. A method of plotting a regional image on a series of matching rectangular base plates comprising the steps of:

storing image density information and image point coordinate information for said regional image in a memory, displaying a reproduction of said regional image on a video monitor, superimposing a rectangular grid upon said video reproduction to define a series of rectangular sections of said regional image, producing a series of rectangular base plates having proportions the same as the proportions of said sections, placing said base plates seriatim on a marking surface, surrounding said base plates with a frame fitting snugly thereagainst; said frame having a framing recess of a depth matching the thickness of said base plates, so that the surface of said base plates and the surface of said frame cooperatively define a substantially continuous surface, displaying on said monitor a rectangular plotting window of a size which includes and surrounds one of said sections, moving said plotting window to successively surround each of said sections, successively plotting the areas encompassed within said plotting window on base plates positioned as aforesaid in said frame; each such plotting operation producing a reproduction of one of said sections on one of said base plates with no unmarked border.

8. A method of plotting a series of image points collectively defining a regional image comprising the steps of:

digitally storing image density information for said image points and positional information for said image points, using said positional information to move a plotting pen across a series of marking positions in the interior and at the perimeter of each of a plurality of contiguous base plates, vertically supporting said plotting pen coplanar with the base plate surface when said plotting pen is at those of said marking positions which are located at the perimeter of a base plate, and using said image density information to cause selective marking of said plotting pen on said base plates while said plotting pen is being moved and supported as aforesaid.

9. A method according to claim 8 wherein said base plates are rectangular.

10. A method according to claim 9 wherein said base plates are mounted within a rectangular frame during plotting thereof, said rectangular frame having a surface which is contiguous and coplanar with the surface of a base plate for performing said vertically supporting step.

* * * * *